(12) United States Patent
Padawer et al.

(10) Patent No.: US 10,346,906 B2
(45) Date of Patent: Jul. 9, 2019

(54) CREDIT REPAIR USER INTERFACE

(71) Applicant: Progrexion IP, Inc., North Salt Lake City, UT (US)

(72) Inventors: Justin Randall Padawer, Bountiful, UT (US); Gavin Mark Van Wagoner, Salt Lake City, UT (US)

( * ) Notice: Subject to any disclaimer, the term of this patent is extended or adjusted under 35 U.S.C. 154(b) by 1014 days.

(21) Appl. No.: 13/787,552

(22) Filed: Mar. 6, 2013

(65) Prior Publication Data
US 2014/0258084 A1    Sep. 11, 2014

(51) Int. Cl.
  *G06Q 40/00* (2012.01)
  *G06Q 40/02* (2012.01)
(52) U.S. Cl.
  CPC .................. *G06Q 40/025* (2013.01)
(58) Field of Classification Search
  CPC ...................... G06Q 40/00; G06Q 40/025
  See application file for complete search history.

(56) References Cited

U.S. PATENT DOCUMENTS

| 7,853,493 B2 * | 12/2010 | DeBie | G06Q 40/00 705/30 |
| 2004/0138995 A1 * | 7/2004 | Hershkowitz | G06Q 40/02 705/38 |
| 2009/0106846 A1 * | 4/2009 | Dupray et al. | 726/26 |
| 2013/0173449 A1 * | 7/2013 | Ng et al. | 705/38 |
| 2014/0025562 A1 * | 1/2014 | Rothrock | G06Q 40/025 705/38 |

OTHER PUBLICATIONS

Is there an app for that? Electronic health records (EHRS) and a new environment of conflict prevention and resolution, Katsh, Ethan; Sondheimer, Norman; Dullabh, Prashila; Stromberg, Samuel. Law and Contemporary Problems74.3: 31(26). Duke University, School of Law. (Jul. 2011-Sep. 2011).*
PCT/US14/17341, Notification of Transmittal of the International Search Report and the Written Opinion of the International Searching Authority, or Declaration dated Jul. 1, 2014. (6 pages).

* cited by examiner

*Primary Examiner* — Lalita M Hamilton
(74) *Attorney, Agent, or Firm* — Workman Nydegger

(57) ABSTRACT

A user interface that may be used to assist in the generation of a plan to improve a credit score of an individual. The user interface includes multiple trade line matched set visualizations, each set resulting from matching similar trade lines from multiple credit reports from multiple credit bureaus. Each of at least some of the trade line set visualizations is visually associated with one or more controls that may be interacted with by the user (e.g., by the individual about whom the credit reports relate), to select from an action to be performed with respect to the alleged event. The action may be a request to the credit bureaus to verify the information supporting the trade line, even without challenging the truth of the underlying information.

19 Claims, 10 Drawing Sheets

| Account | Negative Items | | | Action To Take (?) |
|---|---|---|---|---|
| | TransUnion | EQUIFAX | Experian | |
| CIVIL COURT OF THE CITY<br>D01234<br>Civil Claim | ✓ | ✓ | ✓ | ● Item Verify  ○ Not Mine<br>○ Never Late  ○ Ignore |
| HSBC BANK<br>321256<br>Charge Off | ✓ | ✓ | ✓ | ● Item Verify  ○ Not Mine<br>○ Never Late  ○ Ignore |
| NCO - MEDCLEAR<br>123654<br>Collection | ✓ | ✓ | ✓ | ● Item Verify  ○ Not Mine<br>○ Never Late  ○ Ignore |
| LEADER MORTGAGE<br>5688967<br>30-day Late Payment | ✓ | ✓ | ✓ | ○ Item Verify  ● Not Mine<br>○ Never Late  ○ Ignore |
| Mattress Giant<br>7905-7909<br>58547457<br>Charge Off | ✓ | ✓ | ✓ | ● Item Verify  ○ Not Mine<br>○ Never Late  ○ Ignore |
| BEST BUY/HSBC<br>42568558<br>Collection | ✓ | ✓ | ✓ | ○ Item Verify  ● Not Mine<br>○ Never Late  ○ Ignore |

If applicable, please select a track below that best fits and accurately reflects your credit situation and history.

601 → Divorce
602 → Student Loans
603 → Medical Bills
604 → Identity Theft
605 → Military Service MEDICAL BILLS CIRCUMSTANCES
Many Americans are just one health issue away from serious financial trouble. Fortunately, federal law protects your medical privacy even with regard to credit reporting. Moreover, health issues can impact even non-medical accounts, and credit companies must abide by specific consumer protections wherever applicable. If unexpected medical problems were the main reasons your credit score declined, then this focus track may be helpful.

START CUSTOMIZATION

Please customize my case for Medical Bills Circumstances >

| CIVIL COURT OF THE CITY | Type: Civil Claim | Date: N/A |
| D01234 | | |

Designation
○ This is a medical bill
○ Not a medical bill, but potentially impacted by illness
○ Not a medical bill and not impacted by illness Bureau: Equifax

| HSBC Bank | Type: Charge Off | Date: N/A |
| 321456 | | |

Designation
○ This is a medical bill
○ Not a medical bill, but potentially impacted by illness
○ Not a medical bill and not impacted by illness

*Figure 7*

Creditor Actions:

View Complete Creditor Action History

Most Recent Creditor Actions — 6

See All...

| Account | Intervention Type | Date Sent |
|---|---|---|
| BANK OF AMERICA | Goodwill Letter | 01/01/08 |
| PROVIDIAN | Validation Demand | 01/01/08 |
| BANK OF AMERICA | Escalated Information Request | 01/01/08 |
| BANK OF AMERICA | Goodwill Letter | 11/26/07 |
| BANK OF AMERICA | Goodwill Letter | 10/31/07 |
| BANK OF AMERICA | Escalated Information Request | 09/25/07 |

CREDIT REPAIR USER INTERFACE

BACKGROUND

A credit bureau (also called a Consumer Reporting Agency or CRA) is a company that collects information from various sources about individuals, and aggregates such information into a credit report. Currently, there are three major credit bureaus in the United States including EQUIFAX®, TRANSUNION® and EXPERIAN®.

The credit reports are relied upon by potential and current creditors of the individual, and other authorized entities, when determining whether to take appropriate action regarding the corresponding individual, such as whether to extend credit and under what terms, whether to lease a property, whether to extend an offer of employment, and so forth. Thus, negative items on an individual's credit report can adversely affect the opportunities available to that individual.

Often, a credit score is generated based on the credit report, which allows for a quick and rough approximation of the creditworthiness of the individual. One common credit score used in most applications for credit is called a FICO® SCORE®. FICO and FICO SCORE are registered trademarks of Fair Isaac Corporation. However, there are other scores less commonly used that also rely on credit report items as input, but that are generated via algorithms other than those utilized by FICO.

Credit repair services are offered by a number of organizations for the purpose of helping individuals improve their credit scores, and consequently, the opportunities available to them. Credit repair organizations employ various strategies on behalf of their clients. For example, credit repair organizations may request that credit bureaus demonstrate that an individual's credit report trade lines have been reported fairly and accurately and can be fully substantiated by the associated information providers. For instance, by causing correspondence to be sent to the credit bureaus directly, in the form of an investigative inquiry or perhaps just a dispute regarding a questionable negative item, the credit bureaus may sometimes, but not always, remove that negative item from their credit reports when it is determined that the negative item is either based upon obviously false information, cannot be readily and fully substantiated, or has not been fairly reported in accordance with applicable consumer protection statutes. Alternatively or in addition, by causing correspondence to be sent to a creditor, the creditor might likewise correspond with the credit bureaus causing the negative item to be removed from affected credit reports. As false, unsubstantiated, or unfairly reported negative items are removed or revised, the individual's credit scores tend to improve.

BRIEF SUMMARY

At least one embodiment described herein relates to the generation and/or use of a user interface that may be used to assist in generating a plan to improve a credit score of an individual. The user interface includes a visualization of multiple trade line matched sets that result from matching similar trade lines from multiple credit reports from multiple credit bureaus. Each trade line matched set is based on information for which the alleged event information corresponds to a same alleged event, but for which the credit bureau is different. Each of at least some of the trade line set visualizations is visually associated with one or more controls that may be interacted with by the user (e.g., by the individual about whom the credit reports relate), to select from an action to be performed with respect to the alleged event.

The action may be a request to the credit bureaus to verify the information supporting the trade line, even without challenging the truth of the underlying information. In some embodiments, the actions may be further customized to particular circumstances of the individual, such as whether the individual is divorced, whether the individual has student loans, whether the individual has medical bills, whether the individual has been a victim of identity them, whether the individual has served in the military, and so forth. The action plan may include multiple actions and a schedule for performing the same such that the individual is not billed for the actions unless already completed.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 5 illustrates a more specific example user interface in which six specific match sets are shown along with the relevant credit bureau that reported regarding the alleged event, and in which selectable controls are provided for the user to select actions to take with respect to the six matched set items;

FIG. 6 illustrates a user interface that allows the user to select a customized situation that applies to the individual;

FIG. 7 illustrates a user interface in which the user is selected with a list of the matched sets, and various options that allow the user to specify the relevance of the custom situation to that particular matched set;

FIG. 10 illustrates a creditor actions user interface that allows the user to see the status on recent actions taken with specific creditors.

DETAILED DESCRIPTION

At least one embodiment described herein relates to the generation and/or use of a user interface that may be used to assist in the generation of a plan to improve a credit score of an individual. The user interface includes multiple trade line matched set visualizations, each set resulting from matching similar trade lines from multiple credit reports from multiple credit bureaus. Each of at least some of the trade line set visualizations is visually associated with one or more controls that may be interacted with by the user (e.g., by the individual about whom the credit reports relate), to select an action to be performed with respect to the alleged event. The action may be a request to the credit bureaus to verify the information supporting the trade line, even without challenging the truth of the underlying information. First, some introductory discussion regarding computing systems will be described with respect to FIG. 1. Then, the user interface and its generation and use will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
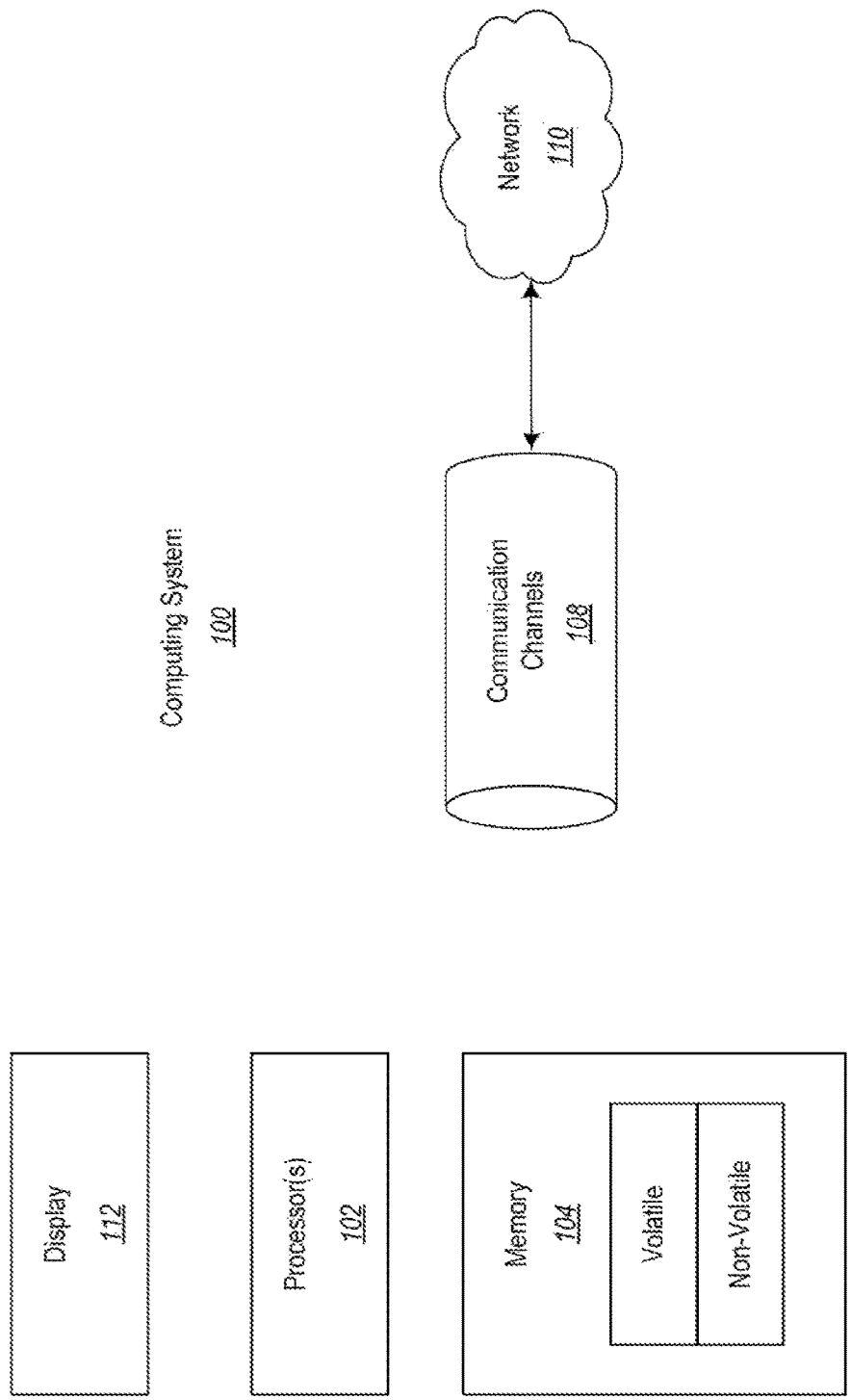
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. If interaction with the user is beneficial, the computing system 100 may also include a display 112 and potentially other input/output devices.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
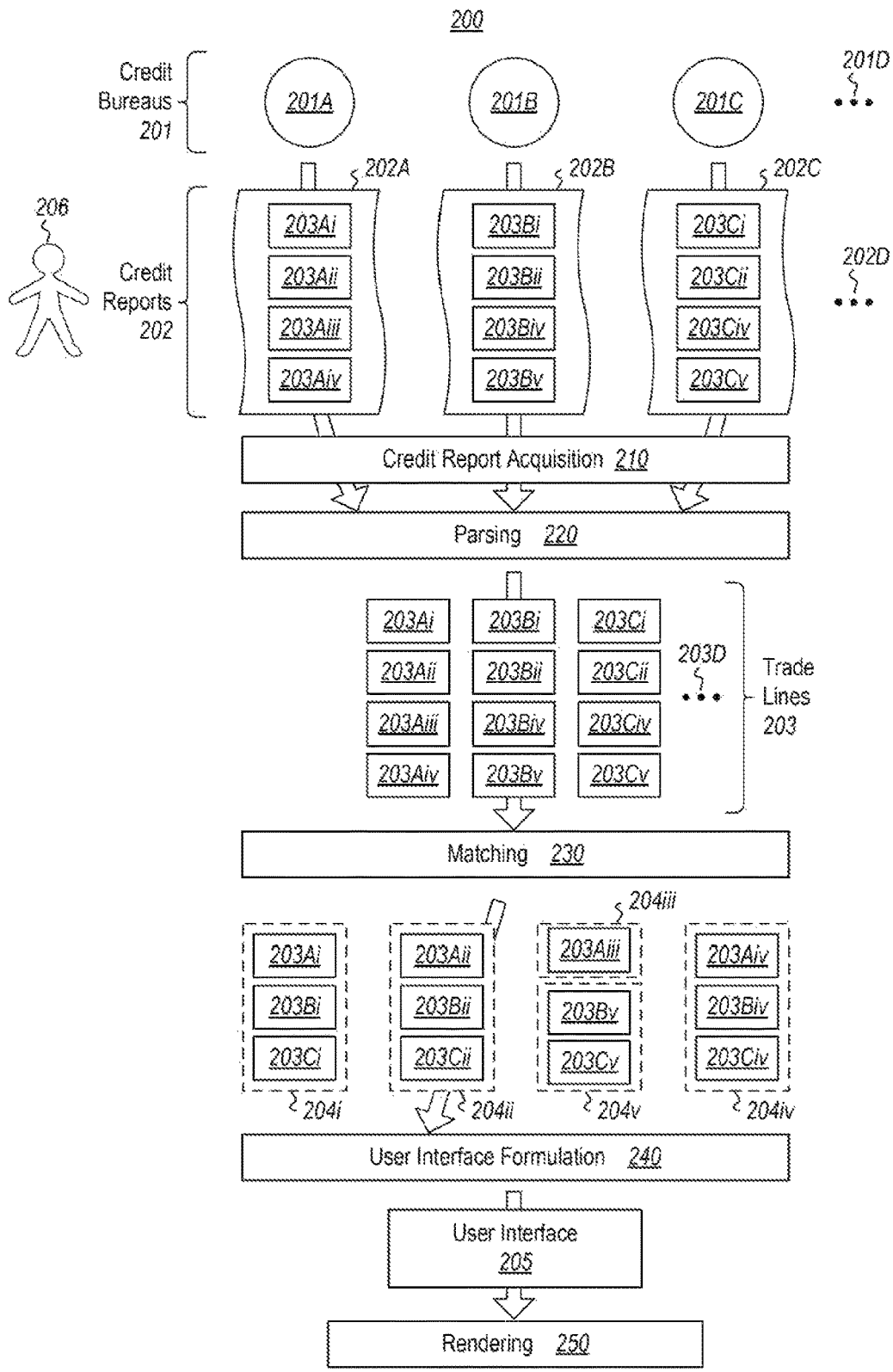
FIG. 2 illustrates a system for improving a credit score of an individual and illustrates a flow from the acquisition of credit reports themselves to the rendering of a user interface that allows a user to take action with respect to the individual's credit report.

FIG. 2 illustrates a system 200 for improving a credit score of an individual. The system 200 includes a credit report acquisition component 210, a parsing component 220, a matching component 230, a user interface formulation component 240 and a rendering component 250. The components 210, 220, 230, 240 and 250 may be located on the same computing system, or may be distributed across multiple computing systems. The system 220 may be an entire system or a part of a larger system. In addition, each of the individual components may likewise be individually distributed across multiple computing systems, or may themselves be part of a larger system. However, the principles described herein are not limited to the precise physical location of any of the components, nor to the remoteness or proximity of any of the components with respect to each other.

Figure 3:
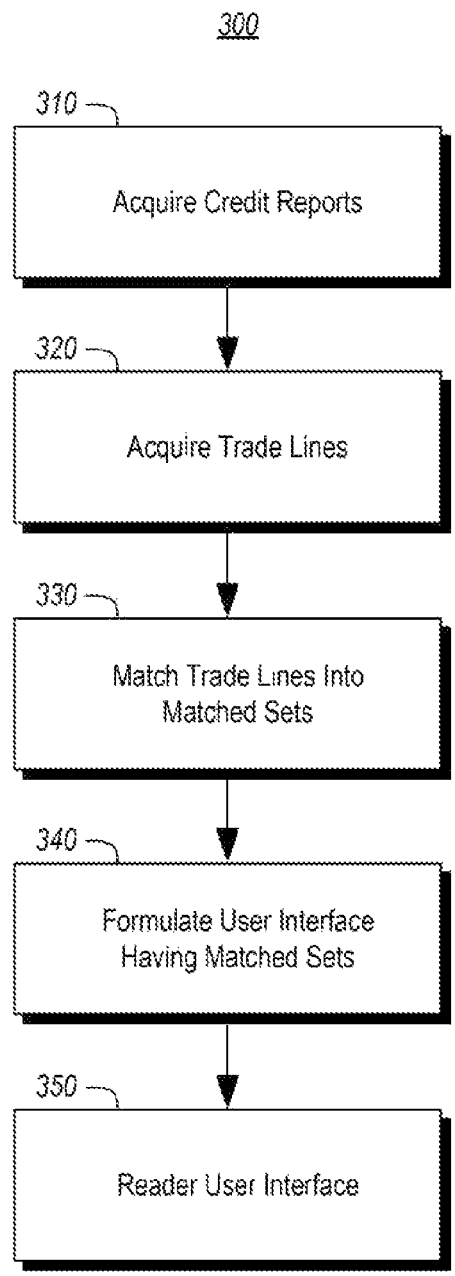
FIG. 3 illustrates flowchart of a method for generating and rendering a user interface that may be used to improve a credit of an individual.

The system 200 performs a method for generating and rendering a user interface that may be used to improve a credit of an individual. FIG. 3 illustrates a flowchart of such a method in the form of method 300. Accordingly, the system 200 of FIG. 2 will be described with frequent reference to the method 300 of FIG. 3.

The credit report acquisition component 210 is configured to obtain credit reports from different credit bureaus (act 310) regarding a particular individual. For instance, in FIG. 2, the credit report acquisition component 210 accesses credit reports 202 regarding individual 206 from credit bureaus 201. For instance, the credit report acquisition component 210 accesses a credit report 202A from credit bureau 201A, accesses a credit report 202B from credit bureau 201B, and accesses a credit report 202C from credit bureau 201C.

FIG. 2 expressly illustrates three credit bureaus 201A, 201B, and 201C providing respective three credit reports 202A, 202B, and 202C. However, the ellipses 201D and 202D represent that there may be two or more credit bureaus, each providing a credit report. Currently, in the United States, however, there are three primary credit bureaus including EQUIFAX®, TRANSUNION® and EXPERIAN®. However, other credit bureaus exist and other credit bureaus may predominate in other regions of the world or at other times. Accordingly, the principles described herein are not limited to the identity of the credit bureaus from which the credit reports are obtained.

Each of these credit reports 202 provide information regarding accounts, transactions and/or events (hereinafter collectively referred to as "events") in which an individual 206 was allegedly engaged. Though the vast majority of information provided in credit reports is accurate, such events will still be referred to herein as "alleged" events since credit bureaus may often also have incorrect or unverifiable information on the credit reports. Furthermore, the credit reports may contain additional information that directly conflicts with accurate information.

Each credit report 202 includes a number of trade lines 203. A trade line is an entry that references an alleged event or set of events that the corresponding credit bureau attributes to the individual. In the nomenclature of FIG. 2, a trade line from credit bureau 201X (where X may be A, B or C) regarding one of five different alleged events Y (where Y may be i, ii, iii, iv, or v) will be labeled 203XY. As an example only, alleged event i might be a balance on a mortgage on a house, event ii might be a home equity line of credit, event iii might be a balance on a credit card, event iv might be balance on a car loan, and event v might be a judgment.

Accordingly, credit report 202A includes trade line 203Ai regarding alleged event i, trade line 203Aii regarding alleged event ii, trade line 203Aiii regarding alleged event iii, and trade line 203Aiv regarding alleged event iv. The credit report 202A from credit bureau 201A does not include a trade line corresponding to alleged event v.

Credit report 202B includes trade line 203Bi regarding alleged event i, trade line 203Bii regarding alleged event ii, trade line 203Biv regarding alleged event iv, and trade line 203Bv regarding alleged event v. The credit report 202B from credit bureau 201B does not include a trade line corresponding to alleged event iii.

Credit report 202C includes trade line 203Ci regarding alleged event i, trade line 203Cii regarding alleged event ii, trade line 203Civ regarding alleged event iv, and trade line 203Cv regarding alleged event v. The credit report 202C from credit bureau 201C also does not include a trade line corresponding to alleged event iii.

The credit reports 202 are each illustrated as including four trade lines only. This is for illustrative purposes only, as the typical credit report would have more than four trade lines, depending on a financial history of the individual 206.

The parsing component 220 is configured to acquire a plurality of trade lines from at least some of the plurality of credit reports (act 320). In FIG. 2, the parsing component parses all of the trade lines 203 from all of the credit reports 202. This parsing may occur automatically or manually. In the case in which the associated credit bureau provides the credit report in a structured data format (such as extensible markup language) with a known schema, this would further assist in the automated parsing of trade lines from the credit reports. The trade lines 203 are provided to a matching component 230.

The matching component 230 is configured to match the trade lines into the matched sets (act 330). For instance, in FIG. 2, the trade lines 203 are sorted into matched sets 204. Each matched set is a subset of the entire set of trade lines 203 and includes those trade lines for which the event information corresponds to a same alleged event or event set that gave rise to the subset of the plurality of trade lines, but for which the credit bureau is different. In most case, the information provider that provided the information to the credit bureaus will be the same for all trade lines within the match set, although that is not required.

For instance, matched set 204*i* includes trade lines 203Ai, 203Bi and 203Ci corresponding to the same alleged event i, but which trade lines are from different credit bureaus. Match set 204*ii* includes trade lines 203Aii, 203Bii and 203Cii from three different credit bureaus, regarding alleged event ii. Matched set 204*iii* only includes one trade line 203Aiii for alleged event iii, demonstrating that not all credit bureaus are aware of the same alleged events regarding an individual. Match set 204*iv* includes trade lines 203Aiv, 203Biv and 203Civ from three different credit bureaus, regarding alleged event iv. Matched set 204*v* includes two trade lines 203Bv and 203Cv from two credit bureaus 201B and 201C, and regarding event 204v.

The user interface formulation component 240 is configured to formulate a user interface (act 340). For instance, in FIG. 2, the user interface formulation component formulates a user interface 205.

The rendering component 250 is configured to render the user interface generated by the user interface generation component (act 350). For instance, the rendering component 250 renders the user interface 205 on a display (such as display 112 of FIG. 1).

Figure 4:
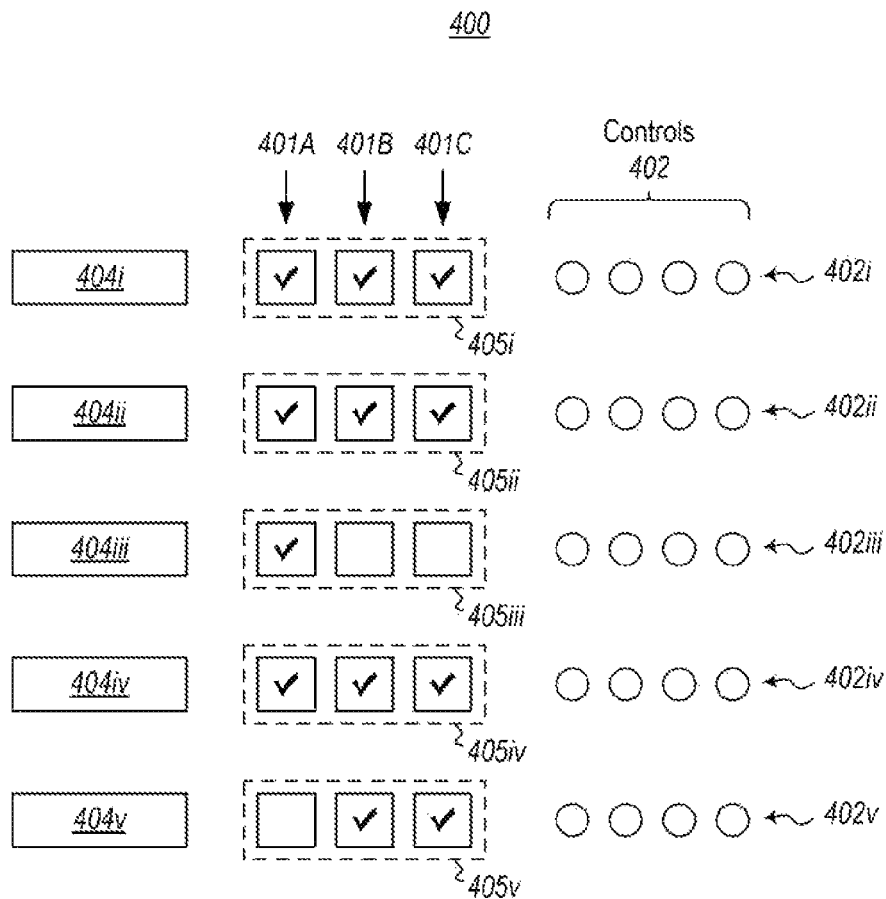
FIG. 4 abstractly illustrates an example user interface in which like trade lines are illustrated as an item, and in which the user is presented with controls to select one of multiple actions to take regarding the item.

FIG. 4 abstractly illustrates just one example user interface 400 that may be generated by the system 200 using the method 300. The user interface 400 represents an example of the user interface 205 of FIG. 2. The user interface 400 includes a visualization of at least some of multiple trade line matched sets. For instance, continuing the example of FIGS. 2 and 3, the matched set visualizations 404i through 404v are visualizations of corresponding trade line matched sets 204i through 204v of FIG. 2. In one embodiment, a more concrete example might be for the visualization to be some text representation describing the information provider and/or the underlying alleged event that is in common for each trade line in the matched set.

In the embodiment of FIG. 4, the matched set visualization 404i through 404v are displayed in a manner that the matched set is visually associated with the credit bureaus corresponding to the constituent trade lines of the corresponding matched set. For instance, credit bureau visualizations 405i through 405v correspond to matched set visualizations 404i and 404v, and are visually associated with the trade line matched set visualizations by being in the same row.

In the embodiment of FIG. 4, the credit bureau visualizations include three columns 401A, 401B and 401C, one for each of corresponding credit bureaus 201A, 201B and 201C. For instance, all three boxes in credit bureau visualization 405i are checked representing that the matched set visualization 404i represents a matched set 204i that includes trade lines from all three credit bureaus. Similarly, all three boxes in credit bureau visualization 40ii are checked representing that the matched set visualization 404ii represents a matched set 204ii that also includes trade lines from all three credit bureaus. However, only the left-most box is checked in credit bureau visualization 405iii, representing that the matched set visualization 404iii represents a matched set 204iii that only includes a trade line from credit bureau 201A. All three boxes in credit bureau visualization 405iv are checked representing that the matched set visualization 404iv represents a matched set 204iv that includes trade lines from all three credit bureaus. However, only the right-most two boxes are checked in credit bureau visualization 405v, representing that the matched set visualization 404v represents a matched set 204v that includes trade lines from credit bureaus 201B and 201C, but not from credit bureau 201A. Thus, a viewer of the user interface (e.g., the individual 206) can quickly evaluate the matched sets.

The user interface 400 also includes controls 402 for each of the trade line matched sets, which allows the user to take action on the trade line matched sets. For instance, the user might interact with the respective controls 402i through 402v in order to select one of multiple actions to be performed with respect to the corresponding alleged event of the respective matched sets 204i through 204v. FIG. 4 illustrates that each control includes 4 controls that might be each selected in order to perform a respective action.

The selected actions might include, for example, a request to verify the alleged event (also referred to herein as performing an "item verify"). Such an item verify would not actually contest that the alleged event occurred, nor would it contest that the alleged event was relevant to the individual. Nevertheless, the item verify would result in the associated credit bureaus and/or creditors being queried to verify that the alleged event did occur and is relevant to the individual, and if such verification cannot occur, to remove the associated trade line as being not verified to be true. In many embodiments, most of the requested actions are of the item verify nature, and thus not a direct challenge to the truth or relevance of the underlying alleged event.

Of course, there may be times when the individual is aware that the alleged event either did not occur or is not relevant to the individual. Accordingly, there may also be selected events that allow the user to challenge that the alleged event even occurred (also referred to herein as a "Never Late" action) or that the alleged event is not related to the individual (also referred to as a "Not Mine" action). Other actions might be to ignore the alleged event, which would result in no action being taken on the alleged event.

FIG. 5 illustrates a more specific example user interface 500 in which six specific match sets are shown along with the relevant credit bureau that reported regarding the alleged event. In addition, the user has selected which actions to take on which matched sets. For instance, for the first, second, third and fifth alleged event, the user selects to perform the Item Verify action. For the fourth and sixth alleged events, the user selects to perform the Not Mine action. In some embodiments, there may be a "select all" type option that allows the user to perform an item verify action on all matched sets.

The completion of this user interface 205, 400, or 500 by the user results in a selection of a number of actions being taken regarding alleged events reported on the individual's credit report. Based on these selections, a comprehensive action schedule may be automatically generated using all selected actions. For instance, the actions might involve sending a particular type of letter to a credit bureau and/or to a creditor. The comprehensive action schedule might change as positive results of previous actions are observed. A cost associated with each action may be estimated. The customer may pay as agreed, but by evaluating the cost of each action performed, the system can automatically verify that no customer is billed for any actions until proper value for such actions has been accomplished.

The individual may have some specific situations that have relevance to the action schedule, or the content of correspondence that are dispatched to credit bureaus or to creditors. For instance, FIG. 6 illustrates a user interface 600 that allows the user to select a customized situation that applies to the individual. For instance, the individual might be divorced (resulting in the user selecting control 601), have a student loan (resulting in the user selecting control 602), have medical bills (resulting the user selecting control 603), be a victim of identity theft (resulting in the user selecting control 604), or be engaged in or had been engaged in military service (resulting in the user selecting control 605).

In each of these situations, there may be laws or judgments in place that affect the rights of the individual with respect to the credit report, or there might be situations in which some compassion, sympathy, or appreciation is due the individual. Accordingly, such situations might result in different letter types and/or content being dispatched to credit bureaus and/or creditors.

If the user selects a particular customized situation (such as the medical bill control 603), more user interfaces may be presented to allow the individual to reference each matched set to determine what relevance this particular situation has to that matched set. For instance, FIG. 7 illustrates a user interface 700 in which the user is selected with a list of the matched sets, and various options that allow the user to specify the relevance of the custom situation to that particular matched set. In the case of medical bills, there are options to specify that the matched set either 1) represents a medical bill itself, 2) is not a medical bill, but was impacted by illness, or 3) is not a medical bill, and was not impacted by illness. Different options for specifying relevance might be available for each customized situation. For instance, for military service, there might be questions regarding whether the alleged event occurred while the individual was on active duty or deployed abroad.

Accordingly, the principles described herein present a user interface in which the various alleged events recorded on various credit reports can be viewed in a unified way, allowing the user to take action paths with respect to each alleged event. Furthermore, specialized information might be used to generate more complete, relevant, and persuasive letters to advocate in a customized way on behalf of an individual.

Figure 8:
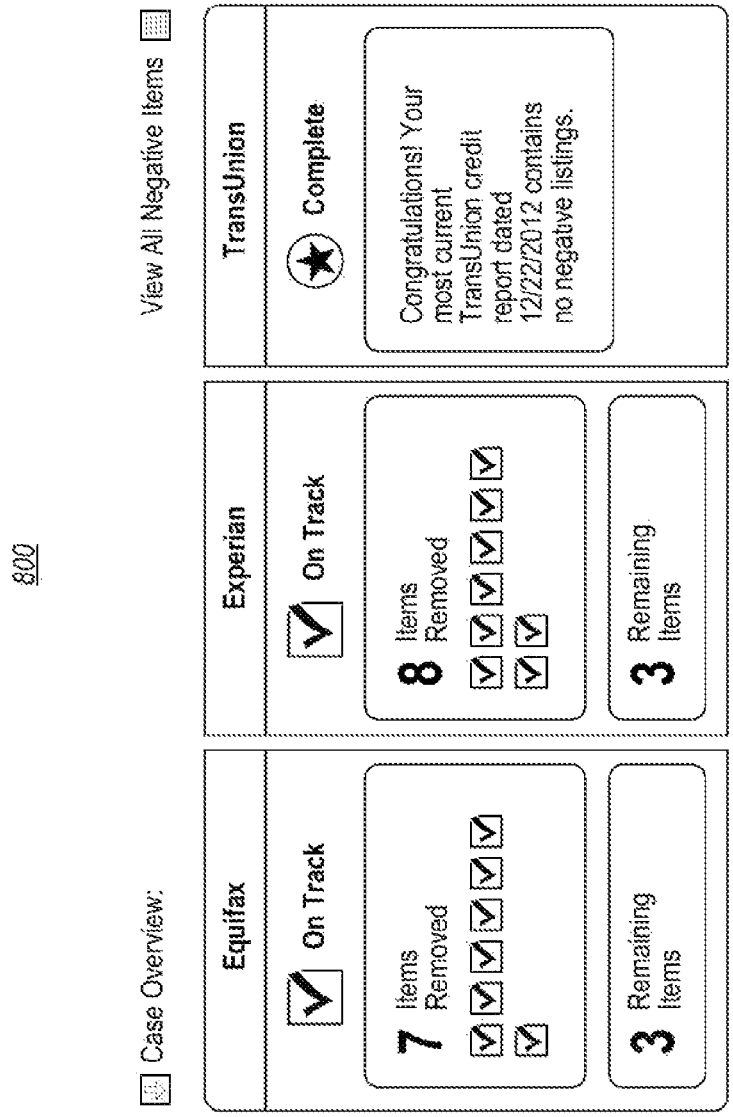
FIG. 8 illustrates a case overview user interface that allows the user to see how many negative items have been removed, and how many remain, for each credit bureau.

The user interface may also be used to view progress of actions already taken. For instance, FIG. 8 illustrates a case overview user interface 800 that allows the user to see how many negative items have been removed, and how many remain, for each credit bureau.

Figure 9:
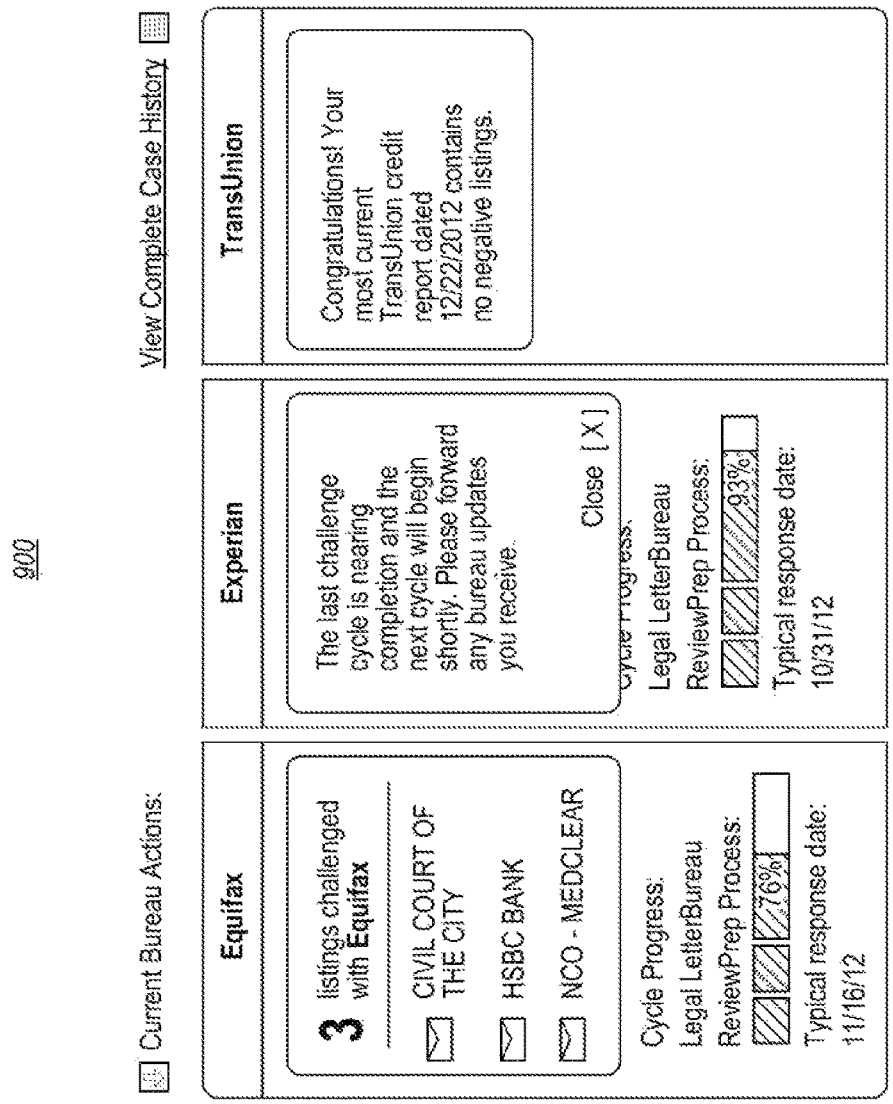
FIG. 9 illustrates a credit bureau actions user interface that allows the user to see the status on recent actions taken with credit bureaus.

FIG. 9 illustrates a credit bureau actions user interface 900 that allows the user to see the status on recent actions taken with credit bureaus, and potentially also provide instructions to the user where user input is needed for further action directed towards the credit bureaus.

FIG. 10 illustrates a creditor actions user interface 1000 that allows the user to see the status on recent actions taken with specific creditors, and potentially also provide instructions to the user where user input is needed for further action directed towards the creditors.

Accordingly, effective user interfaces are also described that allow the user to understand the actions that have been taken with respect to credit bureaus and creditors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer program product comprising one or more computer-readable storage media having thereon computer-executable instructions that, when executed by one or more processors of a computing system, cause the computing system to generate a user interface by at least performing the following:

the computer system accessing a plurality of reports generated from a plurality of different credit bureau sources for an individual, each report identifying a plurality of different report items corresponding to different events;

the computer system parsing the plurality of reports to identify the different report items;

the computer system generating matched sets of the report items by at least matching report items from one report with report items from one or more different reports in the plurality of reports from the different credit bureau sources, wherein all report items in a single matched set are associated with a common corresponding event;

the computer system displaying at least some of the matched sets in a user interface display, each of the matched sets being associated with a different corresponding event and being displayed as a single entry on the interface display along with indicators that indicate which of the plurality of different credit bureaus sources have report items associated with the corresponding event, wherein at least a first matched set includes a plurality of indicators indicating that all of the plurality of different credit bureau sources have a corresponding report item for the first matched set and wherein at least a second matched set includes a plurality of indicators indicating that less than all of the credit bureau sources have a corresponding report item for the second matched set;

the computer system displaying, for each of the matched sets, a plurality of different controls that, when selected, initiate a different set of one or more corresponding remedial actions to be performed with respect to the corresponding event; and the computer system, in response to a selection of one of the plurality of different controls, triggering a corresponding remedial action, the remedial action including dispatching one or more letter for at least one of initiating an accuracy verification of the corresponding event with one or more of the plurality of credit bureaus or initiating a dispute with one or more of the credit bureaus for a report item to have the report item removed.

2. The non-transitory computer program product in accordance with claim 1, wherein the remedial action includes initiating the accuracy verification of the corresponding event without challenging accuracy of event information associated with the corresponding event.

3. The non-transitory computer program product in accordance with claim 2, wherein the remedial action includes initiating the dispute with the one or more of the credit bureaus for the report item to have the report item removed.

4. The non-transitory computer program product in accordance with claim 3, wherein initiating the dispute is to dispute that the event information is applicable to the individual.

5. A method implemented by a computing system for presenting and using a specialized interface for facilitating credit repair, the method comprising:

the computer system accessing a plurality of reports generated from a plurality of different credit bureau sources for an individual, each report identifying a plurality of different report items corresponding to different events;

the computer system parsing the plurality of reports to identify the different report items;

the computer system generating matched sets of the report items by at least matching report items from one report with report items from one or more different reports in the plurality of reports from the different credit bureau sources, wherein all report items in a single matched set are associated with a common corresponding event;

the computer system displaying at least some of the matched sets in a user interface display, each of the matched sets being associated with a different corresponding event and being displayed as a single entry on the interface display along with indicators that indicate which of the plurality of different credit bureaus sources have report items associated with the corresponding event, wherein at least a first matched set includes a plurality of indicators indicating that all of the plurality of different credit bureau sources have a corresponding report item for the first matched set and wherein at least a second matched set includes a plurality of indicators indicating that less than all of the credit bureau sources have a corresponding report item for the second matched set;

the computer system displaying, for each of the matched sets, a plurality of different controls that, when selected, initiate a different set of one or more corresponding remedial actions to be performed with respect to the corresponding event; and the computer system, in response to a selection of one of the plurality of different controls, triggering a corresponding remedial action, the remedial action including dispatching one or more letter for at least one of initiating an accuracy verification of the corresponding event with one or more of the plurality of credit bureaus or initiating a dispute with one or more of the credit bureaus for a report item to have the report item removed.

6. The method in accordance with claim 5, further comprising:

an act of automatically generating an action schedule based on the selection, wherein the action schedule includes automatically sending a letter to the plurality of different credit bureaus.

7. The method in accordance with claim 6, wherein a comprehensive action schedule is automatically generated based on a plurality of selections for a plurality of different match sets.

8. The method in accordance with claim 7, further comprising:

using a value associated with each of a plurality actions corresponding to the comprehensive action schedule to ensure that the particular individual is not billed prior to work being completed.

9. The computer system in accordance with claim 8, wherein the plurality of reports comprise credit reports and wherein the system further comprises:

a parsing component configured to acquire a plurality of trade lines from the plurality of credit reports.

10. The method in accordance with claim 6, further comprising:

an act of determining that a set of one or more circumstances apply to the individual, and customizing the letter to the set of one or more circumstances, the determination being based on a user selection of a customizing situation from a plurality of different customizing situations that applies to the individual, the customizing situation being displayed at the user interface for selection with the plurality of customizing situations, wherein selection of the customizing situation triggers a display of a relevance designation interface having selectable options for associating a relevance to the corresponding event.

11. The method in accordance with claim 10, wherein the set of one or more circumstances include a divorce of the individual.

12. The method in accordance with claim 10, wherein the set of one or more circumstances include a presence of a student loan of the individual.

13. The method in accordance with claim 10, wherein the set of one or more circumstances includes a presence of a medical bill of the individual.

14. The method in accordance with claim 10, wherein the set of one or more circumstances includes an occurrence of an identity theft of the individual.

15. The method in accordance with claim 10, wherein the set of one or more circumstances includes a military service of the individual.

16. A computer system comprising:

at least one processor;

at least one memory or storage media having thereon computer-executable instructions that are structured such that are executable by the at least one processor to cause the system to implement a method for presenting and using a specialized interface to facilitate credit repair, wherein the method includes:

the computer system accessing a plurality of reports generated from a plurality of different credit bureau sources for an individual, each report identifying a plurality of different report items corresponding to different events;

the computer system parsing the plurality of reports to identify the different report items;

the computer system generating matched sets of the report items by at least matching report items from one report with report items from one or more different reports in the plurality of reports from the different credit bureau sources, wherein all report items in a single matched set are associated with a common corresponding event;

the computer system displaying at least some of the matched sets in a user interface display, each of the matched sets being associated with a different corresponding event and being displayed as a single entry on the interface display along with indicators that indicate which of the plurality of different credit bureaus sources have report items associated with the corresponding event, wherein at least a first matched set includes a plurality of indicators indicating that all of the plurality of different credit bureau sources have a corresponding report item for the first matched set and wherein at least a second matched set includes a plurality of indicators indicating that less than all of the credit bureau sources have a corresponding report item for the second matched set;

the computer system displaying, for each of the matched sets, a plurality of different controls that, when selected, initiate a different set of one or more corresponding remedial actions to be performed with respect to the corresponding event; and the computer system, in response to a selection of one of the plurality of different controls, triggering a corresponding remedial action, the remedial action including dispatching one or more letter for at least one of initiating an accuracy verification of the corresponding event with one or more of the plurality of credit bureaus or initiating a dispute with one or more of the credit bureaus for a report item to have the report item removed.

17. The computer system in accordance with claim 16, wherein the system further includes:

a rendering component configured to render a user interface that displays the matched sets and plurality of different controls.

18. The computer system in accordance with claim 16, the system further comprising:
   a matching component configured to match the report items.

19. The method of claim 10, wherein the method further includes displaying a different set of selectable options for different customizing situations.

* * * * *

UNITED STATES PATENT AND TRADEMARK OFFICE
CERTIFICATE OF CORRECTION

PATENT NO. : 10,346,906 B2
APPLICATION NO. : 13/787552
DATED : July 9, 2019
INVENTOR(S) : Padawer et al.

Page 1 of 1

It is certified that error appears in the above-identified patent and that said Letters Patent is hereby corrected as shown below:

In the Specification

Column 2
Line 12, change "them" to –theft–
Line 40, change "flowchart" to –a flowchart–

Column 6
Line 53, change "case" to –cases–

Column 7
Line 20, change "trade line" to –trade lines–

Column 11
Line 39, change "plurality actions" to –plurality of actions–

Column 12
Line 15, change "that are" to –that they are–

Signed and Sealed this
Twelfth Day of November, 2019

Andrei Iancu
*Director of the United States Patent and Trademark Office*